US012651414B2

(12) United States Patent
Welles et al.

(10) Patent No.: US 12,651,414 B2
(45) Date of Patent: Jun. 9, 2026

(54) VISUALIZATION OF A KNOWLEDGE DOMAIN

(71) Applicant: Apple Inc., Cupertino, CA (US)

(72) Inventors: Meghan C. Welles, Los Angeles, CA (US); Stacey L. Matthias, Venice, CA (US); Daniel Ulbricht, Sunnyvale, CA (US); Jim J. Tilander, Redondo Beach, CA (US); Mariano Merchante, Los Angeles, CA (US); Sarune Baceviciute, Culver City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/880,115

(22) Filed: Aug. 3, 2022

(65) Prior Publication Data

US 2023/0048501 A1 Feb. 16, 2023

Related U.S. Application Data

(60) Provisional application No. 63/233,410, filed on Aug. 16, 2021.

(51) Int. Cl.
*G06T 19/00* (2011.01)
*G06V 20/20* (2022.01)
*G09B 5/02* (2006.01)

(52) U.S. Cl.
CPC ............ *G06T 19/006* (2013.01); *G06V 20/20* (2022.01); *G09B 5/02* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,898,871 B1 * | 2/2018 | Reagan | .................. G06V 20/20 |
| 11,003,308 B1 * | 5/2021 | Dryer | ........................ G06T 7/62 |
| 11,282,404 B1 | 3/2022 | Yang et al. | |
| 2005/0220178 A1 | 10/2005 | Ginis | |

(Continued)

FOREIGN PATENT DOCUMENTS

| | | |
|---|---|---|
| CN | 111713090 A | 9/2020 |
| CN | 112509151 A | 3/2021 |
| GB | 2533789 A | 7/2016 |

OTHER PUBLICATIONS

European Patent Office, Search Report and Search Opinion, European Patent Application No. 22189093.2, 11 pages, Jan. 18, 2023.

(Continued)

*Primary Examiner* — Aaron M Richer
(74) *Attorney, Agent, or Firm* — Thompson Hine LLP

(57) ABSTRACT

An exemplary process obtains sensor data corresponding to a physical environment including one or more physical objects. A physical property of the one or more physical objects is determined based on the sensor data. A presentation mode associated with a knowledge domain is determined. An extended reality environment including a view of the physical environment and a visualization selected based on the determined presentation mode is provided. The visualization includes virtual content associated with the knowledge domain. The virtual content is provided based on display characteristics specified by the presentation mode that depend upon the physical property of the one or more objects.

19 Claims, 7 Drawing Sheets

(56)  References Cited

U.S. PATENT DOCUMENTS

| | | | |
|---|---|---|---|
| 2010/0159434 A1* | 6/2010 | Lampotang | G09B 23/28 |
| | | | 434/365 |
| 2013/0278631 A1* | 10/2013 | Border | G06F 3/04842 |
| | | | 345/633 |
| 2016/0005326 A1 | 1/2016 | Syrmis et al. | |
| 2018/0189994 A1 | 7/2018 | Lawton et al. | |
| 2018/0196819 A1 | 7/2018 | Zhang et al. | |
| 2019/0073536 A1* | 3/2019 | Jha | H04N 25/76 |
| 2019/0130792 A1* | 5/2019 | Rios | G09B 23/285 |
| 2019/0139430 A1 | 5/2019 | Ghatage et al. | |
| 2019/0259205 A1 | 8/2019 | Nissinen et al. | |
| 2019/0266906 A1 | 8/2019 | Lewis | |
| 2019/0293609 A1 | 9/2019 | Oh et al. | |
| 2019/0370544 A1* | 12/2019 | Wright, Jr. | G06Q 10/20 |
| 2020/0160090 A1* | 5/2020 | Agrawal | G06T 7/60 |
| 2020/0375666 A1* | 12/2020 | Murphy | A61B 34/20 |
| 2021/0082191 A1 | 3/2021 | Tajik | |

OTHER PUBLICATIONS

Zappar, Mindshare Futures, "Layered. The Future of Augmented Reality," 34 pages, 2018.

China National Intellectual Property Administration, First Office Action and Search Report issued in Chinese Patent Application No. 202210975956.8 dated Mar. 18, 2026 with English translation (23 pages).

Xu, "Research on Difference Teaching of Physics in Middle School Supported by Information Technology", 2020, with partial English translation (Five (5) pages).

* cited by examiner

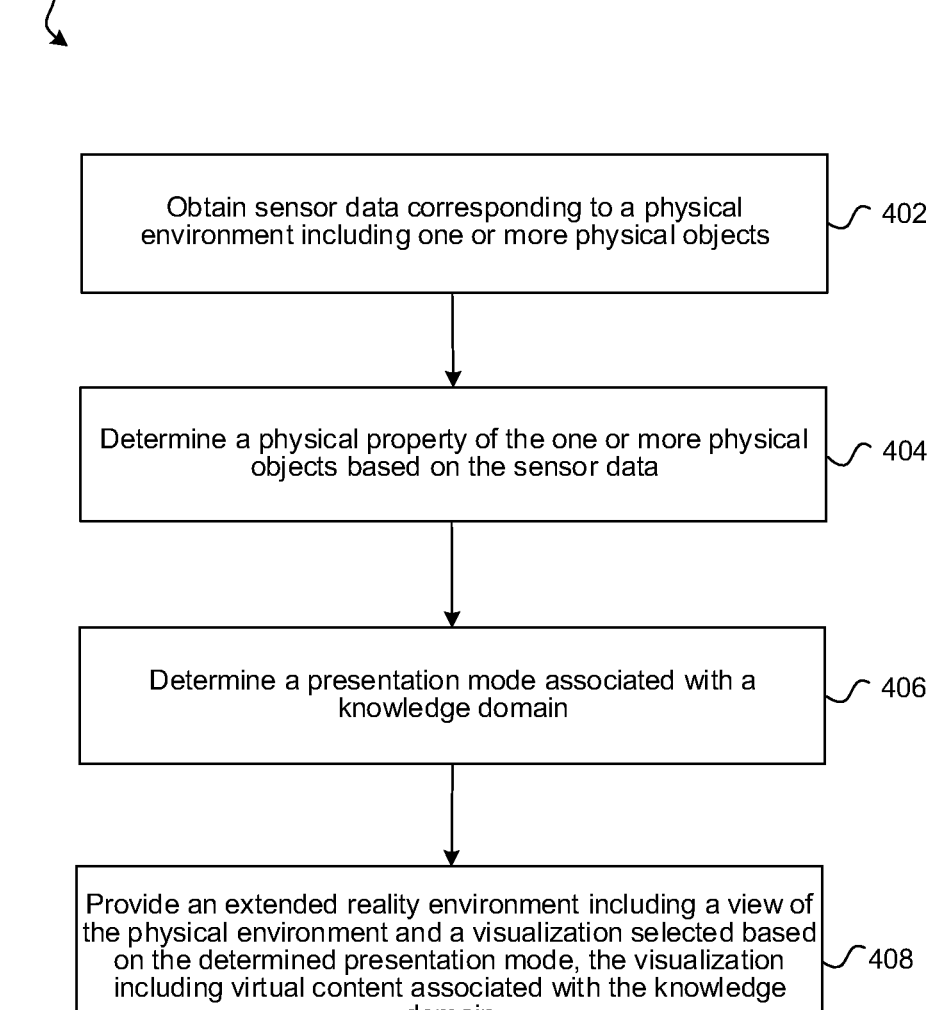

400

Obtain sensor data corresponding to a physical environment including one or more physical objects — 402

Determine a physical property of the one or more physical objects based on the sensor data — 404

Determine a presentation mode associated with a knowledge domain — 406

Provide an extended reality environment including a view of the physical environment and a visualization selected based on the determined presentation mode, the visualization including virtual content associated with the knowledge domain — 408

FIG. 4

Device 600

VISUALIZATION OF A KNOWLEDGE DOMAIN

CROSS-REFERENCE TO RELATED APPLICATIONS

This application claims the benefit of U.S. Provisional Application Ser. No. 63/233,410 filed Aug. 16, 2022, which is incorporated herein in its entirety.

TECHNICAL FIELD

The present disclosure generally relates to electronic devices, and in particular, to systems, methods, and devices for modifying views of a physical environment using computer-generated content to provide visualization of a knowledge domain.

BACKGROUND

Various electronic devices may provide a user with an extended reality experience that integrates rendered three-dimensional (3D) graphics (e.g., virtual objects) into a live video stream of a physical environment captured by a camera. In some instances, it may be desirable to provide computer-generated visual effects based on physical properties of objects in the physical environment to provide visualization of a knowledge domain. For example, it may be desirable for an education experience to provide phenomenon-based thinking experiences in extended reality environments to better engage students. Phenomenon-based thinking experiences may provide different perspectives to improve understanding, provide learners with a breadth of exposure, and provide learners with an opportunity to teach each other and co-curate shared experiences in order to develop social competencies while achieving mastery and internalizing knowledge.

SUMMARY

Various implementations disclosed herein include devices, systems, and methods that provide an immersive experience (e.g., a learning experience) in an extended reality (XR) environment. For example, the experience may provide different presentation modes, e.g., for different knowledge/scientific domains, that provide different visualization layers to illustrate different scientific concepts. Each visualization layer of the XR environment has virtual content that is provided based on scene understanding, e.g., which objects are wood, which are metal, etc. For example, in an electric field domain, visualization can be provided to illustrate the effect of what Wi-Fi signals would look like if you could see them (e.g., making the invisible visible). For example, virtual electromagnetic waves may be provided from a Wi-Fi source, and visual effects of the electromagnetic waves may be altered based on the physical properties of the objects (e.g., wood, metal, glass, etc.). In another example, a chemistry knowledge domain may illustrate properties of objects as the objects interact in the environment. In some implementations, properties of the physical environment may be determined and used in providing the experience. For example, radiation properties of absorption, surroundings, etc., may be estimated and used to provide an experience that illustrates scientific concepts based on these properties. An immersive learning experience may be provided in an XR environment to provide a phenomena-driven learning experience that uses enhanced representation capabilities to visualize impossible learning scenarios (e.g., making the "invisible visible"), which can enable learning and improve understanding of conceptually difficult concepts.

In general, one innovative aspect of the subject matter described in this specification can be embodied in methods, at an electronic device having a processor, that include the actions of obtaining sensor data corresponding to a physical environment comprising one or more physical objects, determining a physical property of the one or more physical objects based on the sensor data, determining a presentation mode associated with a knowledge domain, and providing an extended reality (XR) environment comprising a view of the physical environment and a visualization selected based on the determined presentation mode, the visualization comprising virtual content associated with the knowledge domain, the virtual content provided based on display characteristics specified by the presentation mode that depend upon the physical property of the one or more objects.

These and other embodiments can each optionally include one or more of the following features.

In some aspects, determining the physical property of the one or more physical objects based on the sensor data comprises determining a scene understanding of the physical environment using computer-vision.

In some aspects, the knowledge domain corresponds to a scientific domain.

In some aspects, determining the presentation mode associated with the knowledge domain comprises receiving input selecting an educational experience. In some aspects, determining the presentation mode associated with the knowledge domain comprises an automatic selection of the presentation mode based on a criterion.

In some aspects, the visualization comprises a visualization layer that is overlaid on the view of the physical environment.

In some aspects, the one or more physical objects comprise a first object and a second object, the first object comprising a first physical property and a second object comprising a second physical property that is different than the first physical property.

In some aspects, the virtual content includes, a first virtual content portion that provides a first interaction with the first object based on a first display characteristic specified by the presentation mode based on the first object having the first physical property, and a second virtual content portion that provides a second interaction with the second object based on a second display characteristic specified by the presentation mode based on the second object having the second physical property, wherein the first interaction and the second interaction are different types of interactions.

In some aspects, the method further includes detecting an interaction with a physical object of the one or more physical objects, and providing, based on the interaction, the presentation mode and a physical property of the physical object.

In some aspects, the knowledge domain is a first knowledge domain of a plurality of knowledge domains, and the presentation mode is associated with the plurality of knowledge domains.

In some aspects, the plurality of knowledge domains comprises a second knowledge domain that is different than the first knowledge domain, the method further including modifying the visualization based on the second knowledge domain.

In some aspects, the physical property comprises at least one of a material composition, an object type, and an object classification.

In some aspects, the sensor data comprises depth data and light intensity image data obtained during an image capture process.

In some aspects, the electronic device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of an exemplary method that provides an XR environment including a view of a physical environment and a visualization selected based on a determined presentation mode associated with a knowledge domain in accordance with some implementations.

Figure 1:
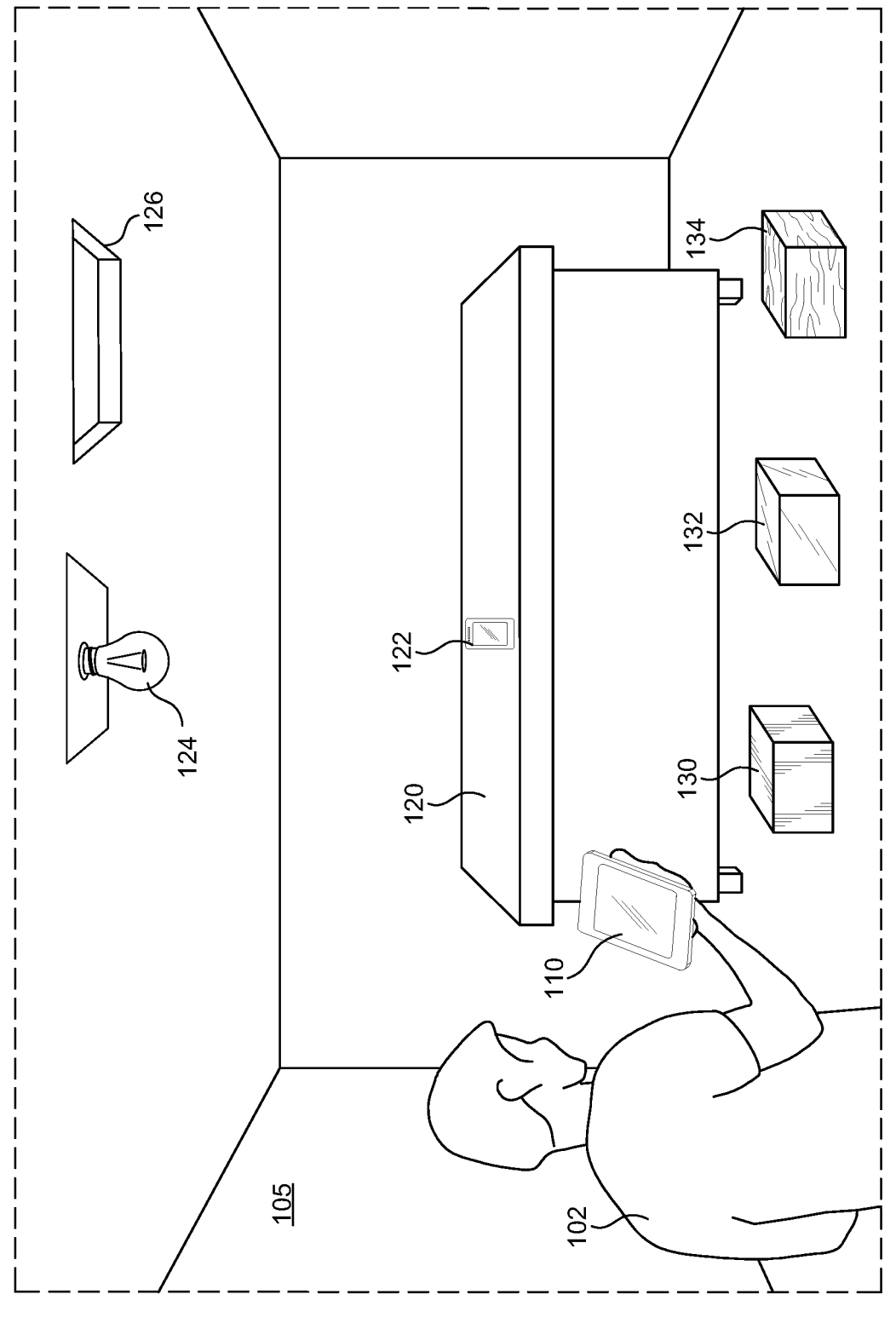
FIG. 1 is an example of a device used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an exemplary operating environment 100 in accordance with some implementations. In this example, the example operating environment 100 involves an exemplary physical environment 105 that includes physical objects such as desk 120, device 122, light source 124 (e.g., a light bulb), light source 126 (e.g., a skylight), object-1 130, object-2 132, and object-3 134. Additionally, physical environment 105 includes user 102 holding device 110. In some implementations, the device 110 is configured to present a extended reality (XR) environment to the user 102.

In some implementations, the device 110 is a handheld electronic device (e.g., a smartphone or a tablet). In some implementations, the device 110 is a near-eye device such as a head worn device. The device 110 utilizes one or more display elements to present views. For example, the device 110 can display views that include the physical environment and a visualization layers overlaid on the views of the physical environment in the context of an extended reality (XR) environment. In some implementations, the device 110 may enclose the field-of-view of the user 102. In some implementations, the functionalities of device 110 are provided by more than one device. In some implementations, the device 110 communicates with a separate controller or server to manage and coordinate an experience for the user. Such a controller or server may be located in or may be remote relative to the physical environment 105.

A physical environment (e.g., physical environment 105) refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2A:
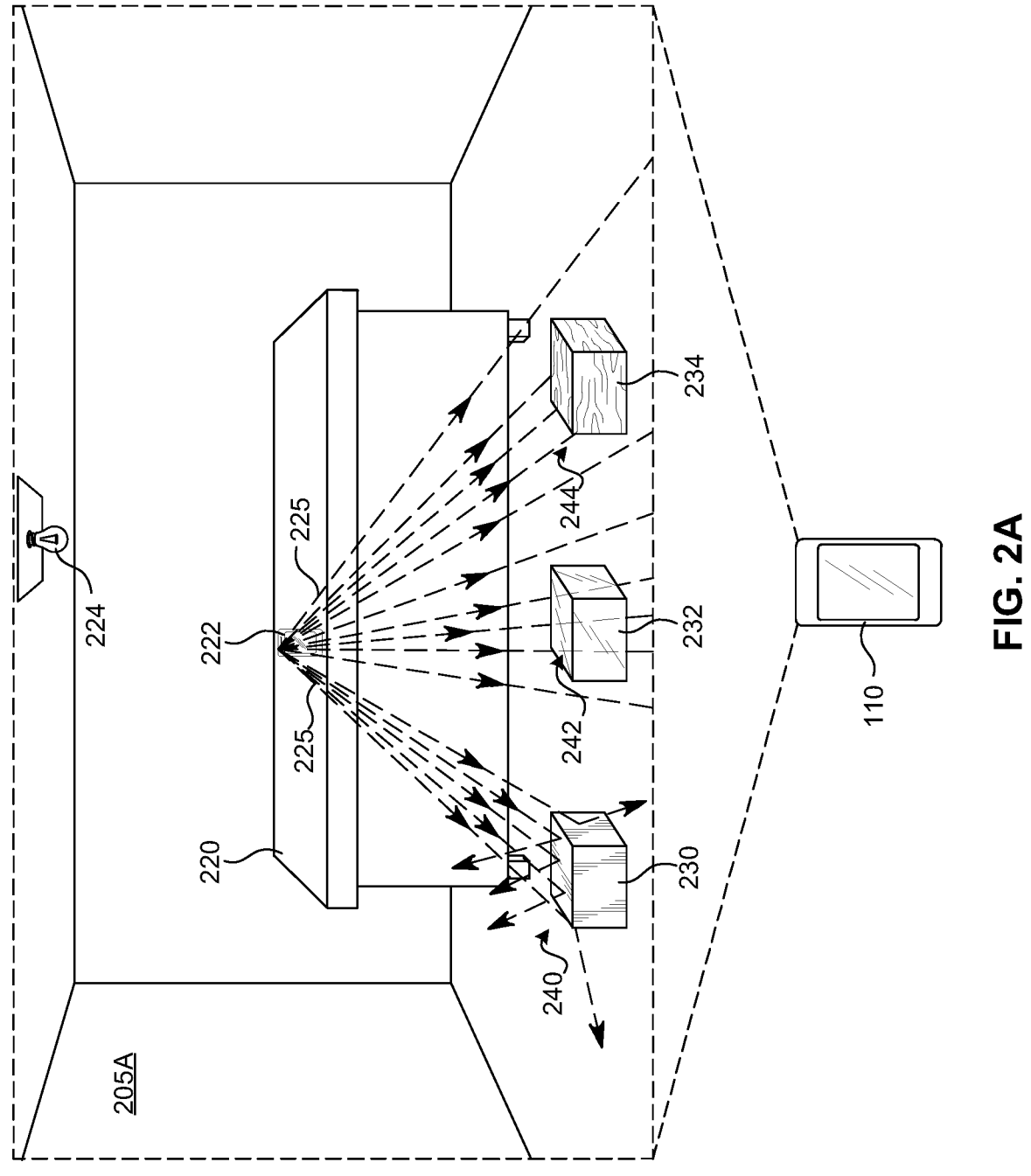
FIGS. 2A and 2B illustrate example views provided by the device of FIG. 1, the views including features of a knowledge domain within the physical environment in an extended reality (XR) environment in accordance with some implementations.
Figure 2B:
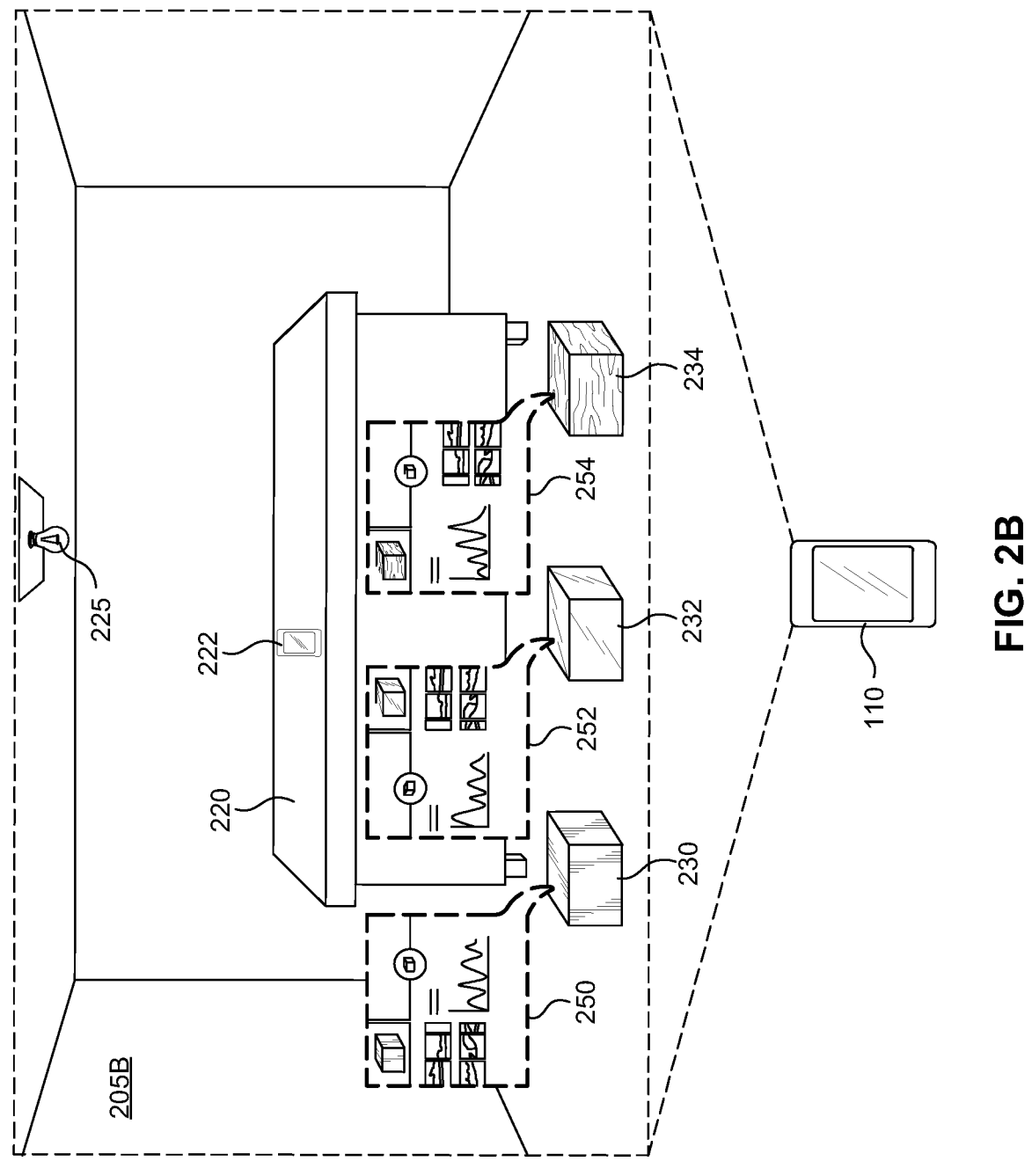

FIGS. 2A and 2B illustrate exemplary views provided by the display elements of device 110. The views present an XR environment that includes aspects of a physical environment (e.g., environment 105 of FIG. 1). Additionally, FIGS. 2A and 2B illustrate aspects of a presentation mode based on features associated with a knowledge domain presented as visualization layers overlaid on aspects of the physical environment. The first view 205A, depicted in FIG. 2A, provides a view of the physical environment 105 from a first presentation mode (e.g., a scientific effect display mode). The second view 205B, depicted in FIG. 2B, provides a view of the physical environment 105 for a second presentation mode that is different than the first presentation mode (e.g., a knowledge display mode). The first view 205A and second view 205B each include a representation 220 of the desk 120, a representation 222 of the device 122, representation 224 of the light source 124, representation 230 of the object-1 130, representation 232 of the object-2 132, and representation 234 of the object-3 134.

FIG. 2A includes content that corresponds to features of a first presentation mode for a knowledge domain associated with a particular scientific domain (e.g., electromagnetic waves). The first presentation mode as depicted in view 205A displays the electromagnetic waves that are disseminated from the representation 222 of device 122 (e.g., a Wi-Fi source). For example, the first presentation mode may include an educational experience that illustrates for the user, in an immersive learning experience, the effect of what Wi-Fi signals would look like if you could see them (e.g., make the "invisible visible"). Virtual electromagnetic waves/signals 225 may be provided from a Wi-Fi source (e.g., representation 222 of device 122), and visual effects of the electromagnetic waves may be altered based on the physical properties of the objects (e.g., wood, metal, glass, etc.). For example, object-1 130 (representation 230) is determined to be made of metal such that the electromagnetic waves from the source (e.g., device 122) are shown as being deflected off of the representation 230 at area 240. Additionally, object-2 132 (representation 232) is determined to be made of glass (or another similar material), such that the electromagnetic waves from the source (e.g., device 122) are shown as being passed through the representation 232 at area 242. Further, object-3 134 (representation 234) is determined to be made of wood (or plastic or another similar material that has similar physical properties like wood, i.e., density), such that the electromagnetic waves from the source (e.g., device 122) are shown as being blocked or absorbed (e.g., don't pass through) by the representation 234 at area 244.

During an education session, for example, a user may utilize a presentation mode for exploring different scientific domains of the objects within the physical environment. FIG. 2B includes content that corresponds to features of a second presentation mode for a knowledge domain associated with an educational display mode (e.g., educational display windows/panels, also referred to as knowledge cards). The presentation mode, as depicted in view 205B, displays to the user (e.g., user 102) educational display panels 250, 252, 254 associated with representations 230, 232, 234, respectively, in the view 205B. The educational display panels 250, 252, 254 may be displayed based on user interaction with the particular object (e.g., representation 230 of object-1 130, representation 232 of object-2 132, etc.). For example, a user interacts (e.g., clicks or taps) on the representation 230, and the education display panel 250 may be displayed. Additionally, or alternatively, educational display panels may be displayed for each object of interest as determined by the educational system associated with the processes presented herein. For example, a teacher (or the content creators) may select which objects an education display panel should be displayed based on the current learning lesson. The educational display panels 250, 252, 254 may include educational information for the user about that particular object (e.g., types of material, density, mass, volume, size measurements, and the like).

In some implementations, the educational display panels 250, 252, 254 being developed include multiple portions (e.g., windows, panes, other virtual objects) that may be selected and moved by the user or the system in any 3D location within the viewing environment. For example, the user may have positioned educational display panels 250 (e.g., at a 3D position) above the desk representation 220. Similarly, the device 110 may enable the user to control or specify a preference regarding positioning of the educational display panels 250, 252, 254. For example a user (or a teacher, content creators, etc.) can specify whether the educational display panels 250, 252, 254 will be fixed in a 3D position always, fixed in a 3D position until a condition is satisfied, or provided at a fixed device location, as examples.

In some implementations, the device 110 may enable the user to inspect the 3D depiction of the educational display panels 250, 252, 254. The device 110 may enable inspection of the 3D depiction of the educational display panels from different viewpoints, for example, by fixing the 3D location of the educational display panels relative to the physical environment 105 and enabling the user to move around and view different sides of the 3D depiction of the educational display panels from different viewing positions. The ability to inspect the educational display panels may facilitate, simplify, and improve the efficiency of the education process. Additionally, the educational display panels may have time-based and/or include interactive features (e.g., video content, user interface content, interactive 3D objects, media content, etc.) and the view may facilitate interacting with such features.

In some implementations, the educational display panels 250, 252, 254 are anchored to a pixel location on a display of the device 110 and thus not anchored to the same 3D coordinate location relative to the 3D environment. Thus, as the device 110 is moved through a series of different viewpoints (e.g., as a user moves his or her head while wearing an HMD), the educational display panels would not remain anchored above the desk representation 230. Instead, the educational display panels may be anchored to the same pixel location on the display of the device 110 and thus appear to move with the user as he or she moves or re-orients the device.

Figure 3:
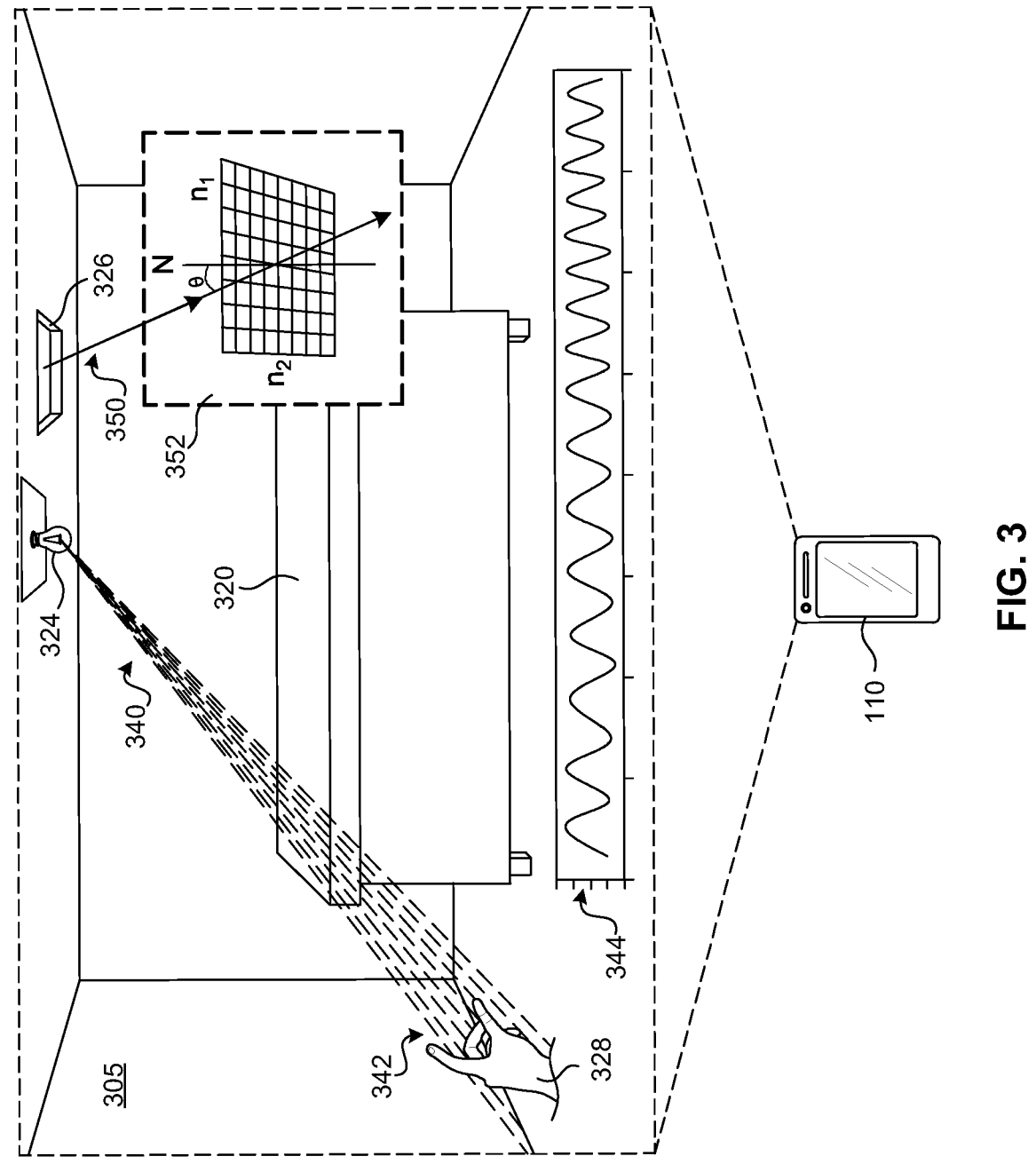
FIG. 3 illustrates an example view provided by the device of FIG. 1, the view including features of a knowledge domain within the physical environment in an XR environment in accordance with some implementations.

FIG. 3 illustrates an exemplary view 305 provided by the display elements of device 110. In particular, the view 305 presents an XR environment that includes aspects of a physical environment (e.g., environment 105 of FIG. 1) and aspects of a presentation mode (e.g., a scientific effect display mode) based on features associated with a knowledge domain presented as visualization layers (e.g., virtual content) overlaid on aspects of the physical environment. The view 305 includes a representation 320 of the desk 120, representation 324 of the light source 124, representation 326 of the light source 126. Additionally, the view 305 includes a representation 328 of a user's hand (e.g., user 102 of FIG. 1). For example, if the view 305 is seen via pass through video or an optical view of a live video, a user can see his or her physical hand. Alternatively, if the view 305 is a CGR environment, representation 328 may be a virtual hand that represents a 3D location of where the user is interacting with that location with his or her hand.

FIG. 3 includes content that corresponds to features of a presentation mode for a knowledge domain associated with a particular scientific domain (e.g., optics and light refraction). The presentation mode as depicted in view 305 displays light rays 340 that are disseminated from the representation 324 (e.g., a light source, such as a central lighting fixture or light bulb in a room), and light rays 350 that are disseminated from the representation 326 (e.g., a light source, such as sunlight shining through a ceiling skylight). For example, the presentation mode associated with view 305 may include an educational experience that illustrates for the user, in an immersive learning experience, the effect of what light rays would look like if you could see them (e.g., make the "invisible visible"). Virtual light rays 340 may be provided from a light source (e.g., representation 324 of light source 124), and visual effects of the light rays may be engaged by the user moving his or her hand (e.g., representation 328) into the light rays 340. For example, light rays 340 are absorbed by the representation 328 of the user's hand as shown at area 342. Additionally, an educational display panel 344 may be presented that graphically illustrates the wavelength of the light rays 340.

FIG. 3, as depicted in view 305, further includes another example of the scientific domain associated with optics and light refraction. For example, light rays 350 are disseminated from the representation 326 (e.g., a light source, such as sunlight shining through a ceiling skylight). The presentation mode as depicted in view 305 further illustrates an educational display panel 352 based on the light rays 350. In particular, educational display panel 352 illustrates Snell's law, a formula used to describe the relationship between the angles of incidence θ and refraction, when referring to light or other waves passing through a boundary between two different isotropic media, such as water, glass, or air (e.g., sunlight rays passing through representation 326, a skylight).

FIG. 4 is a flowchart representation of an exemplary method 400 that provides an XR environment including a view of the physical environment and a visualization selected based on the determined presentation mode associated with a knowledge domain in accordance with some implementations. In some implementations, the method 400 is performed by a device (e.g., device 110 of FIG. 1), such as a mobile device, desktop, laptop, or server device. In some implementations, the device has a screen for displaying images and/or a screen for viewing stereoscopic images such as a head-mounted display (HMD). In some implementations, the method 400 is performed by processing logic, including hardware, firmware, software, or a combination thereof. In some implementations, the method 400 is performed by a processor executing code stored in a nontransitory computer-readable medium (e.g., a memory). The knowledge domain presentation process of method 400 is illustrated with examples with reference to FIGS. 2-3 and illustrated as a system flow diagram with reference to FIG. 5.

At block 402, the method 400 obtains sensor data corresponding to a physical environment comprising one or more physical objects. For example, capturing one or more images the user's current room, depth data, and the like. In some implementations, the sensor data includes depth data and light intensity image data obtained during an image capture process.

At block 404, the method 400 determines a physical property of the one or more physical objects based on the sensor data. The physical property of the one or more physical objects may include material composition, object type, object classification, and the like. The physical property may include a material composition, an object type, and/or an object classification (e.g., glass, wood, metal, etc.).

Additionally, or alternatively, in some implementations, determining a physical property of the one or more physical objects based on the sensor data may include computer-vision-based scene understanding. For example, an object detection process may be used to determine a type and a physical property of an object. In some implementations, the method 400 involves a machine learning model that detects objects and physical properties thereof based on image data (e.g., light intensity image data and depth data captured by sensors of device 110). In some implementations, the machine learning model is a neural network (e.g., an artificial neural network), decision tree, support vector machine, Bayesian network, or the like.

At block 406, the method 400 determines a presentation mode (e.g., domain) associated with a knowledge domain. In some implementations, knowledge domain corresponds to a scientific domain in an educational experience. For example, determining a presentation mode may involve receiving input from a user to enter a scientific domain. Additionally, or alternatively, determining a presentation mode may involve automatic selection of a presentation mode/educational experience.

At block 408, the method 400 provides an XR environment including a view of the physical environment and a visualization selected based on the determined presentation mode. The visualization includes virtual content associated with the knowledge domain. In some implementations, the visualization includes a visualization layer that is overlaid on the view of the physical environment (e.g., virtual electromagnetic waves/signals 225 as illustrated in FIG. 2B, educational display panels 250, 252, 254, as illustrated in FIG. 2B, and the like). In some implementations, the virtual content may be provided based on display characteristics (e.g., how the virtual content will interact with a physical object) specified by the presentation mode that depend upon the physical property of the one or more objects. For example, the user can enter a specific scientific domain in which properties are specific to that domain. For instance, in an electric field domain, a visualized electric field interacts with objects made of metal but not objects made of wood. In another instance, in a property inspection domain, the user zooms into a wood object and, since the object is made of wood, a zoomed in view of wood. For example, as illustrated in FIG. 2B, education display panel 254 includes annotations about the characteristics of wood for the representation 234 associated with object-3 134 is provided for the user to learn from.

In some implementations, determining the presentation mode associated with the knowledge domain includes receiving input (e.g., user input) selecting an educational experience. For example, a user selects the presentation mode to show the scientific domain, e.g., showing the WiFi signals. Additionally, or alternatively, determining the presentation mode associated with the knowledge domain comprises an automatic selection of the presentation mode based on a criterion. For example, detected interactions with a particular object such as a light source, an electromagnetic source, zooming in on an object, etc.

In some implementations, a scientific domain's presentation mode is based on providing different types of interaction of virtual content with different physical objects having different characteristics, e.g., the virtual electromagnetic field reacts to objects made of metal differently than objects made of wood (e.g., an electric field domain as illustrated in FIG. 2A). In an exemplary implementation, the one or more physical objects comprise a first object and a second object, the first object comprising a first physical property and a second object comprising a second physical property that is different than the first physical property. In some implementations, the virtual content includes a first virtual content portion that provides a first interaction with the first object based on a first display characteristic (e.g., electric waves will pass through) specified by the presentation mode based on the first object having the first physical property, and a second virtual content portion that provides a second interaction with the second object based on a second display characteristic (e.g., electric waves will react to) specified by the presentation mode based on the second object having the second physical property, wherein the first interaction and the second interaction are different types of interactions. For example, as illustrated in FIG. 2A, a visualized electric field interacts with objects made of metal but not objects made of wood.

In some implementations, the method 400 further includes detecting an interaction with a physical object of the one or more physical objects (e.g., zooming in on the particular object), and providing, based on the interaction, the presentation mode and a physical property of the physical object. For example, the user (e.g., user 102) zooms into a wood object (e.g., representation 234 of object-3 134) and, since the object is made of wood, a zoomed in view of wood (e.g., with annotations about the characteristics of wood) is provided for the user to learn from as educational display panel 254 as illustrated in FIG. 2B.

In some implementations, a learning ecosystem can be provided where the user can be presented with and the ability to jump into different scientific domains to see how the objects interact in the different domains. In an exemplary implementation, the knowledge domain is a first knowledge domain of a plurality of knowledge domains, and the presentation mode is associated with the plurality of knowledge domains. In some implementations, the plurality of knowledge domains includes a second knowledge domain that is different than the first knowledge domain, and the method 400 may further include modifying the visualization based on the second knowledge domain. For example, the user may initially be focused on the electromagnetic properties of the objects made of metal with the electric field domain as illustrated in FIG. 2A, but then want to see the optics and light refraction characteristics for that same object. For example, a user may be able to interact with a representation of an object (e.g., a metal object such as representation 230 of object-1 130) and be provided several different scientific domains to choose from (e.g., electric field domain, optics domain, chemistry domain, etc.). Thus, the visualization layers rendered in the immersive experience have interactive properties that correspond with the selected scientific domain. As the user switches between different scientific domains, the interactive properties of the visualization layers can correspondingly change according to the new scientific domain.

Figure 5:
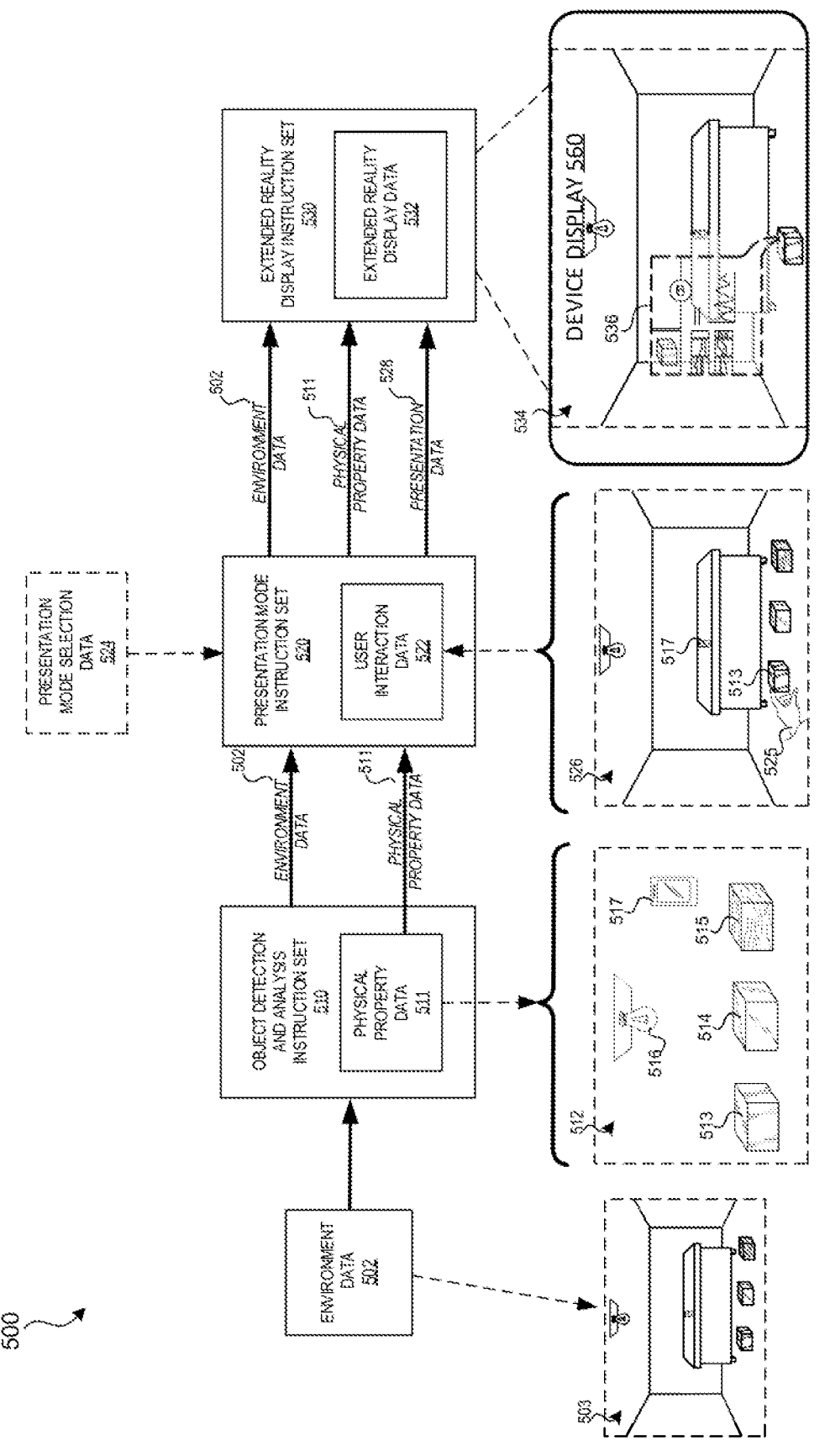
FIG. 5 is a system flow diagram of an example environment that provides an XR environment including a view of a physical environment and a visualization selected based on a determined presentation mode associated with a knowledge domain in accordance with some implementations.

FIG. 5 illustrates a system flow diagram of an example environment 500 in provides an XR environment including a view of a physical environment and a visualization selected based on a determined presentation mode associated with a knowledge domain according to some implementations. In some implementations, the system flow of the example environment 500 is performed on a device (e.g., device 110 of FIG. 1), such as a mobile device, desktop, laptop, or server device. The images of the example environment 500 can be displayed on the device that has a screen for displaying images and/or a screen for viewing stereoscopic images such as a HMD. In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

The system flow of the example environment 500 acquires environment data 502 (e.g., image data) from sensors of a physical environment (e.g., the physical environment 105 of FIG. 1), determines physical property data for objects within the physical environment, obtains user interaction data (e.g., a user interacting with the XR environment) or presentation mode selection data, and generates XR display data for a user to view a visualization selected based on a determined presentation mode associated with a knowledge domain. For example, a presentation mode associated with a knowledge domain technique described herein can allow a user wearing an HMD, for example, view and learn about scientific domain properties of a physical environment, and objects therein (e.g., make the "invisible visible").

In an example implementation, the environment 500 includes an image composition pipeline that acquires or obtains data (e.g., image data from image source(s)) of the physical environment from a sensor on a device (e.g., device 110 of FIG. 1). Example environment 500 is an example of acquiring image sensor data (e.g., light intensity data, depth data, and position information) for a plurality of image frames. For example, image 503 represents acquired image data of a room in a physical environment (e.g., the physical environment 105 of FIG. 1). The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 500 includes an object detection and analysis instruction set 510 that is configured with instructions executable by a processor to generate physical property data 511 for one or more detected objects within the physical environment. For example, the object detection and analysis instruction set 510 obtains environment data 502 (e.g., image data of a physical environment such as the physical environment 105 of FIG. 1), performs an object detection and analysis process, and generates physical property data 511 for the one or more detected objects. For example, as illustrated by image 512, the object detection and analysis process determines physical property data 511 for representation 513 of object-1 130 (e.g., physical properties of metal), representation 514 of object-2 132 (e.g., physical properties of glass), representation 515 of object-3 134 (e.g., physical properties of wood), representation 516 of light source 124 (e.g., properties of associated light rays), and representation 517 for device 122 (e.g., properties of associated light rays).

In an example implementation, the environment 500 further includes a presentation mode instruction set 520 that is configured with instructions executable by a processor to acquire the physical property data 511 from the object detection and analysis instruction set 510 and obtain user interaction data 522 from user interactions with the XR environment 526 and determine presentation data 528 (e.g., select a presentation mode). For example, the presentation mode instruction set 520 can obtain user interaction data 522 of the user during execution of an application program based on user interaction information. The user interaction information may include scene understandings or snapshots, such as locations of objects in the environment, and user interactions with the XR environment 526 (e.g., haptic feedback of user interactions such as hand pose information, clicking a mouse, etc.). Additionally, scene understandings may include obtaining or determining physical properties of each detected object in the physical environment, such as an object type, a material, or other attributes (e.g., density, color, hardness, smell, freezing, melting, and boiling points). The location and physical properties of each detected object that are determined as a part of the scene understanding may be used in providing the experience. For example, as illustrated in FIG. 2A, a scene understanding may include the physical properties of each detected object (e.g., object-1 130 is made of metal, desk 120 is made of wood, etc.).

In some implementations, the scene understanding may be used by content creators to implement particular presentation modes based on the physical properties of the objects in the physical environment that are currently in view for the user. For example, if the user is in a chemistry lab environment, the scene understanding may include identification of a heat source (e.g., a Bunsen burner) and a particular chemical agent set about the heat source that is known to react to heat. The chemical agent may be identified by a label or a bar code on the container holding the chemical agent, or may be identified by the color of the chemical agent. A chemistry presentation mode may be able to demonstrate the chemical reaction if heat was applied to the particular chemical agent. Thus, an exothermic reaction may be illustrated to the user that visualizes the reaction by showing light and heat rays in the immediate surroundings of the chemical agent as heat (e.g., a virtual heat) is applied.

As illustrated in the example XR environment 526, a user's hand 525 is shown as selecting representation 513 which may initiate an associated visualization of a presentation mode associated with a knowledge domain. For example, an educational display panel associated with representation 513 (e.g., a metal box) may be requested. Additionally, or alternatively, if a particular presentation mode is known for a knowledge domain (e.g., electromagnetic waves), then the user's interaction with representation 513 may initiate virtual electromagnetic waves/signals 225 as being deflected off of the representation 230 at area 240 as illustrated in FIG. 2A.

In some implementations, presentation mode selection data 524 may be provided to the presentation mode instruction set 520. For example, a teacher (or the content creators) may have already determined the presentation mode for a particular knowledge domain for a particular learning experience (e.g., electromagnetic properties, light wave properties, chemistry properties), and/or select which objects an education display panel should be displayed based on the current learning lesson.

In some implementations, the environment 500 includes an XR display instruction set 530 that is configured with instructions executable by a processor to assess the environment data 502, the physical property data 511 from the object detection and analysis instruction set 510, and the presentation data 528 from the presentation mode instruction set 520, and present a set of views and/or virtual content within the XR environment based on the user interaction data 522 and/or presentation mode selection data 524. In some implementations, the set of views is displayed on the device display 560 of a device (e.g., device 110 of FIG. 1). For example, the XR display instruction set 530 analyzes the environment data 502, the physical property data 511, and presentation data 528 to generate an XR environment 534. The XR environment 534 includes a 3D representation of the physical environment (video passthrough, optical see through, or a reconstructed virtual room) and integrates views of the visualization application associated with a knowledge domain as an overlay on top of the 3D representation. For example, education display panel 536 is shown after the user selected representation 513 (as shown in XR environment 526).

Figure 6:
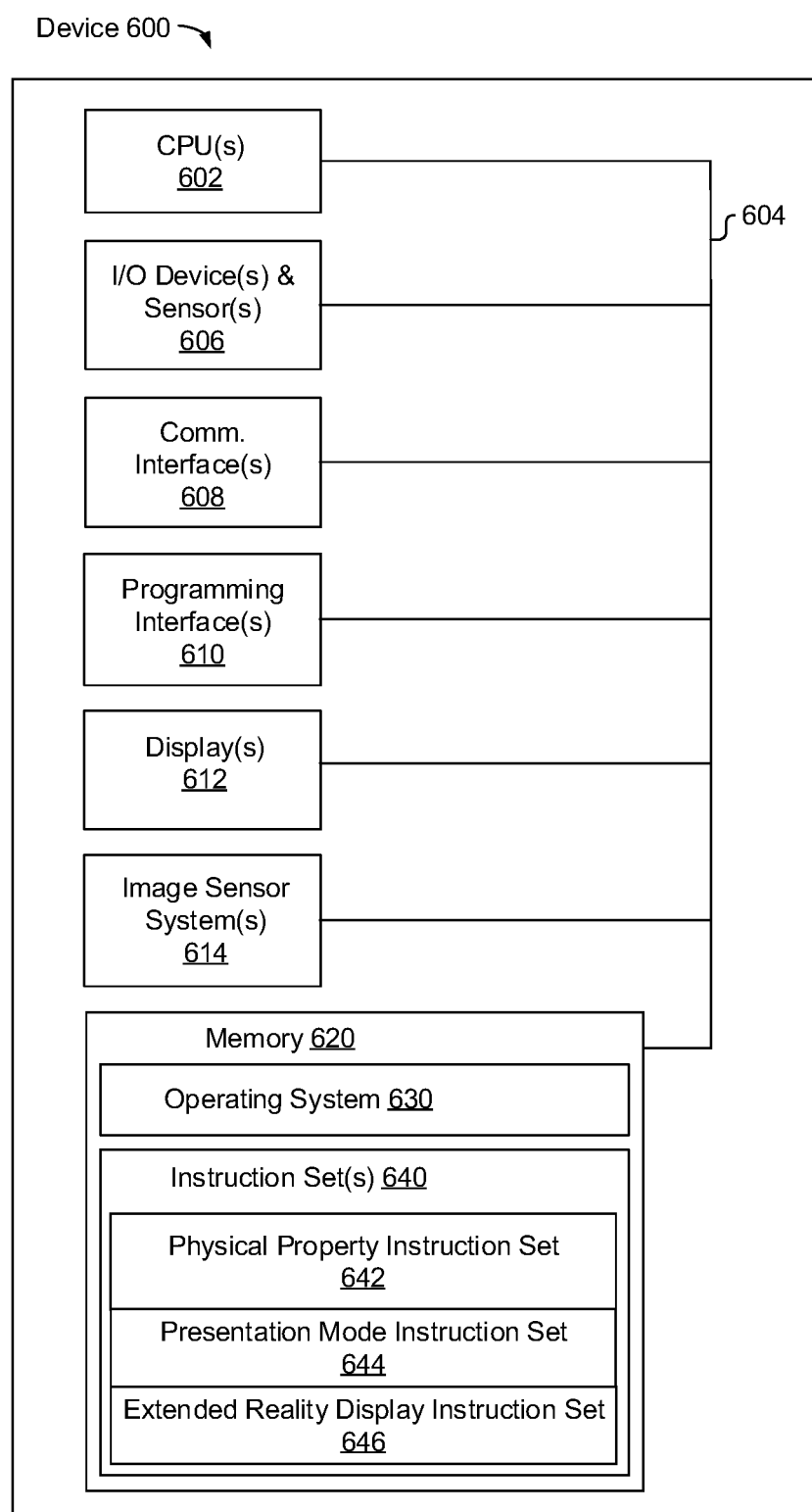
FIG. 6 illustrates an example device in accordance with some implementations.

FIG. 6 is a block diagram of an example device 600. Device 600 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 110 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 330 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes a physical property instruction set 642, a presentation mode instruction set 644, and an extended reality display instruction set 646. The instruction set(s) 640 may be embodied as a single software executable or multiple software executables.

The physical property instruction set 642 (e.g., object detection and analysis instruction set 510 of FIG. 5) is executable by the processing unit(s) 602 to generate physical property data 511. For example, the physical property instruction set 642 obtains environment data 502 (e.g., image data of a physical environment such as the physical environment 105 of FIG. 1), performs an object detection and analysis process, and generates physical property data 511 for the one or more detected objects. As illustrated by image 512, the object detection and analysis process determines physical property data 511 for representation 513 of object-1 130 (e.g., physical properties of metal), representation 514 of object-2 132 (e.g., physical properties of glass), representation 515 of object-3 134 (e.g., physical properties of wood), representation 516 of light source 124 (e.g., properties of associated light rays), and representation 517 for device 122 (e.g., properties of associated light rays).

The presentation mode instruction set 644 (e.g., presentation mode instruction set 520 of FIG. 5) is configured with instructions executable by a processor to acquire the physical property data 511 from the object detection and analysis instruction set 510 and obtain user interaction data 522 from user interactions with the XR environment 526 and determine presentation data 528 (e.g., select a presentation mode). For example, the presentation mode instruction set 520 can obtain user interaction data 522 of the user during execution of an application program based on user interaction information. The user interaction information may include scene understandings (e.g., obtaining or determining physical properties of each detected object in the physical environment, such as an object type, a material, or other attributes) or snapshots, such as locations of objects in the environment, and user interactions with the XR environment 526 (e.g., haptic feedback of user interactions such as hand pose information, clicking a mouse, etc.).

The extended reality display instruction set 646 (e.g., extended reality display instruction set 530 of FIG. 5) is configured with instructions executable by a processor to assess the environment data (e.g., image data), the physical property data of objects in the environment data, and presentation data (e.g., a determined presentation mode), and present a set of views and/or virtual content within the XR environment based on user interaction data and/or presentation mode selection data. In some implementations, the set of views is displayed on the device display 560 of a device (e.g., device 110 of FIG. 1). For example, the XR display instruction set 530 analyzes the environment data 502, the physical property data 511, and presentation data 528 to generate an XR environment 534. The XR environment 534 includes a 3D representation of the physical environment (video passthrough, optical see through, or a reconstructed virtual room) and integrates views of the visualization application associated with a knowledge domain as an overlay on top of the 3D representation. For example, education display panel 536 is shown after the user selected representation 513 (as shown in XR environment 526).

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises"

and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device having a processor:
obtaining sensor data corresponding to a physical environment comprising one or more physical objects;
determining a physical property of the one or more physical objects based on the sensor data;
selecting a knowledge domain from a plurality of knowledge domains based on the determined physical property, wherein each of the knowledge domains corresponds to a different subject area and is associated with a different presentation mode associated with demonstrating one or more principles specific to the subject area of the respective knowledge domain via presentation of content that interacts with the physical environment in three-dimensional (3D) space according to a specific presentation mode, wherein each presentation mode defines rules implementing knowledge domain-specific physical laws;
determining a presentation mode associated with the knowledge domain;
determining, based on the determined presentation mode, content for a visualization associated with the selected knowledge domain, wherein the visualization is configured to interact with the one or more physical objects in the 3D space according to the determined presentation mode and the content for the visualization is generated such that the visualization interacts with the one or more physical objects according to the defined rules of the determined presentation mode in the 3D space; and
providing an extended reality (XR) environment comprising a view of the physical environment and the visualization interacting with the one or more physical objects in the 3D space.

2. The method of claim 1, wherein determining the physical property of the one or more physical objects based on the sensor data comprises determining a scene understanding of the physical environment using computer-vision.

3. The method of claim 1, wherein the selected knowledge domain corresponds to a scientific domain.

4. The method of claim 1, wherein determining the presentation mode associated with the selected knowledge domain comprises receiving input selecting an educational experience.

5. The method of claim 1, wherein determining the presentation mode associated with the selected knowledge domain comprises an automatic selection of the presentation mode based on a criterion.

6. The method of claim 1, wherein the visualization comprises a visualization layer that is overlaid on the view of the physical environment.

7. The method of claim 1, wherein the one or more physical objects comprise a first object and a second object, the first object comprising a first physical property and a second object comprising a second physical property that is different than the first physical property.

8. The method of claim 7, wherein the content for the visualization associated with the selected knowledge domain comprises:

a first virtual content portion that provides a first interaction with the first object based on a first display characteristic specified by the presentation mode based on the first object having the first physical property; and a second virtual content portion that provides a second interaction with the second object based on a second display characteristic specified by the presentation mode based on the second object having the second physical property, wherein the first interaction and the second interaction are different types of interactions.

9. The method of claim 1, further comprising:

detecting an interaction with a physical object of the one or more physical objects; and providing, based on the interaction, the presentation mode and a physical property of the physical object.

10. The method of claim 1, wherein the plurality of knowledge domains comprises a second knowledge domain that is different than the selected knowledge domain, the method further comprising:

modifying the visualization based on the second knowledge domain.

11. The method of claim 1, wherein the physical property comprises at least one of a material composition, an object type, and an object classification.

12. The method of claim 1, wherein the sensor data comprises depth data and light intensity image data obtained during an image capture process.

13. The method of claim 1, wherein the electronic device is a head-mounted device (HMD).

14. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining sensor data corresponding to a physical environment comprising one or more physical objects;

determining a physical property of the one or more physical objects based on the sensor data;

selecting a knowledge domain from a plurality of knowledge domains based on the determined physical property, wherein each of the knowledge domains corresponds to a different subject area and is associated with a different presentation mode associated with demonstrating one or more principles specific to the subject area of the respective knowledge domain via presentation of content that interacts with the physical environment in three-dimensional (3D) space according to a specific presentation mode, wherein each presentation mode defines rules implementing knowledge domain-specific physical laws;

determining a presentation mode associated with the knowledge domain;

determining, based on the determined presentation mode, content for a visualization associated with the selected knowledge domain, wherein the visualization is configured to interact with the one or more physical objects in the 3D space according to the determined presentation mode and the content for the visualization is generated such that the visualization interacts with the one or more physical objects according to the defined rules of the determined presentation mode in the 3D space; and providing an extended reality (XR) environment comprising a view of the physical environment and the visualization interacting with the one or more physical objects in the 3D space.

15. The device of claim 14, wherein determining the physical property of the one or more physical objects based on the sensor data comprises determining a scene understanding of the physical environment using computer-vision.

16. The device of claim 14, wherein the selected knowledge domain corresponds to a scientific domain.

17. The device of claim 14, wherein determining the presentation mode associated with the selected knowledge domain comprises receiving input selecting an educational experience.

18. The device of claim 14, wherein determining the presentation mode associated with the selected knowledge domain comprises an automatic selection of the presentation mode based on a criterion.

19. A non-transitory computer-readable storage medium storing program instructions executable via one or more processors to perform operations comprising:

obtaining sensor data corresponding to a physical environment comprising one or more physical objects;

determining a physical property of the one or more physical objects based on the sensor data;

selecting a knowledge domain from a plurality of knowledge domains based on the determined physical property, wherein each of the knowledge domains corresponds to a different subject area and is associated with a different presentation mode associated with demonstrating one or more principles specific to the subject area of the respective knowledge domain via presentation of content that interacts with the physical environment in three-dimensional (3D) space according to a specific presentation mode, wherein each presentation mode defines rules implementing knowledge domain-specific physical laws;

determining a presentation mode associated with the knowledge domain;

determining, based on the determined presentation mode, content for a visualization associated with the selected knowledge domain, wherein the visualization is configured to interact with the one or more physical objects in the 3D space according to the determined presentation mode and the content for the visualization is generated such that the visualization interacts with the one or more physical objects according to the defined rules of the determined presentation mode in the 3D space; and providing an extended reality (XR) environment comprising a view of the physical environment and the visualization interacting with the one or more physical objects in the 3D space.

\* \* \* \* \*